(12) United States Patent
Kimoto

(10) Patent No.: US 9,977,179 B2
(45) Date of Patent: May 22, 2018

(54) PLASTIC OPTICAL FIBER RIBBON

(71) Applicant: Asahi Glass Company, Limited, Chiyoda-ku (JP)

(72) Inventor: Osakazu Kimoto, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/613,514

(22) Filed: Jun. 5, 2017

(65) Prior Publication Data
US 2017/0351021 A1 Dec. 7, 2017

(30) Foreign Application Priority Data

Jun. 7, 2016 (JP) ................. 2016-113749

(51) Int. Cl.
*G02B 6/02* (2006.01)
*G02B 6/44* (2006.01)
*G02B 6/38* (2006.01)

(52) U.S. Cl.
CPC .......... *G02B 6/021* (2013.01); *G02B 6/3873* (2013.01); *G02B 6/4403* (2013.01)

(58) Field of Classification Search
None
See application file for complete search history.

(56) References Cited

U.S. PATENT DOCUMENTS

2014/0341519 A1* 11/2014 White ................. G02B 6/4403
385/114

FOREIGN PATENT DOCUMENTS

JP 2014-205780 10/2014

OTHER PUBLICATIONS

"Resin Selection and Hihg-Speed Coating of Optical Fibers with UV-Curable Materials"; Kokumon et al.; May 1989; Journal of Lightwave Technology, vol. 7, No. 5; pp. 824-828.*

* cited by examiner

*Primary Examiner* — Jerry Rahll
(74) *Attorney, Agent, or Firm* — Oblon, McClelland, Maier & Neustadt, L.L.P.

(57) ABSTRACT

A plastic optical fiber ribbon excellent in efficiency for positioning to V grooves is provided. The ribbon contains plural plastic optical fibers integrated by a collective coating and arranged so that their center axes are parallel to one another in the same plane. At least one outer surface in the thickness direction of the ribbon has a mountain-valley shape following the outer surfaces of the plastic optical fibers, in which an inclined portion is present where the thickness of the collective coating gradually increases in a direction from the peak toward the valley of the mountain, and in a cross section perpendicular to the longitudinal direction of the ribbon, a central angle of the sector formed by connecting an arc from the apex of the mountain to the starting point of the inclined portion and a center of the plastic optical fiber is from 30 to 80°.

12 Claims, 2 Drawing Sheets

PLASTIC OPTICAL FIBER RIBBON

TECHNICAL FIELD

The present invention relates to a plastic optical fiber ribbon.

BACKGROUND ART

A plastic optical fiber is flexible and does not break, and thus it is superior in handling property as compared with a glass fiber and suitable for wiring between equipments or wiring inside equipments.

As a mode of using a plastic optical fiber, Patent Document 1 discloses an optical fiber ribbon having the structure shown in FIG. 3. This optical fiber ribbon is one wherein a plastic optical fiber 51 is covered with a reinforcing layer 52 and further covered with a resin layer 53 such as a color coat layer to form a plastic optical fiber 54, four of which are arranged in parallel to have a collective coating 55 applied to obtain an optical fiber ribbon 56.

Further, as shown in FIG. 4, an optical fiber ribbon in which a collective coating is thinly formed has also been put on the market. In the FIG., reference numeral 61 denotes a plastic optical fiber, 62 a reinforcing layer, 63 a plastic optical fiber, and 64 a collective coating.

PRIOR ART DOCUMENT

Patent Document

Patent Document 1: JP-A-2014-205780

Disclosure of Invention

Technical Problem

The optical fiber ribbon in which the collective coating is thinly formed as shown in FIG. 4, is suitable for a method of collectively connecting multiple plastic optical fibers to a light source, an equipment, etc. in the state of a ribbon without separating them individually.

However, according to the findings by the present inventors, at the time of collectively connecting multiple core wires by using a fixing member having a plurality of V grooves, when placing the optical fiber ribbon on the plurality of V grooves, misalignment is likely to occur between the center axes of the V grooves and the center axes of the optical fibers, and it may take time for positioning.

It is an object of the present invention to provide a plastic optical fiber ribbon which is excellent in efficiency for positioning to V grooves.

Solution to Problem

The present invention provides the following plastic optical fiber ribbon.

[1] A plastic optical fiber ribbon characterized in that a plurality of plastic optical fibers are arranged so that their center axes are parallel to one another in the same plane and are integrated by a collective coating, wherein at least one outer surface in the thickness direction of the plastic optical fiber ribbon has a mountain-valley shape following the outer surfaces of the plastic optical fibers, in which an inclined portion is present where the thickness of the collective coating gradually increases in a direction from the peak of the mountain toward the valley, and in a cross section perpendicular to the longitudinal direction of the plastic optical fiber ribbon, a central angle θ of the sector formed by connecting an arc from the apex of the mountain to the inclined portion on the outer surface of the plastic optical fiber ribbon and a center of the plastic optical fiber is from 30 to 80°.

[2] The plastic optical fiber ribbon according to [1], wherein the collective coating has a Young's modulus of at least 400 MPa.

[3] The plastic optical fiber ribbon according to [1] or [2], wherein the outer surfaces of adjacent plastic optical fibers are in contact with each other.

[4] The plastic optical fiber ribbon according to [1], [2] or [3], wherein the outer diameters of the plastic optical fibers are from 200 to 750 μm.

[5] The plastic optical fiber ribbon according to any one of [1] to [4], wherein the thickness of the collective coating at the peak of the mountain is from 3 to 50 μm.

[6] The plastic optical fiber ribbon according to any one of [1] to [5], wherein the thickness of the collective coating at the valley is at least 3 μm.

[7] A method for producing a plastic optical fiber ribbon as defined in any one of [1] to [6], wherein a plurality of plastic optical fibers are aligned in parallel and in a row, and in the aligned state, to the outer circumference of them, a resin is applied and cured to form a collective coating.

[8] The method for producing a plastic optical fiber ribbon according to [7], wherein the application of the resin is carried out by a method in which the plurality of plastic optical fibers are, in the aligned state, permitted to enter and run through a coating die.

Advantageous Effect of Invention

The plastic optical fiber ribbon of the present invention is excellent in efficiency for positioning to V grooves.

DESCRIPTION OF EMBODIMENTS

In the present specification, the Young's modulus of the collective coating is a value obtained by the following method.

In accordance with JIS-K7161, the Young's modulus is measured by using a test specimen conforming to JIS-K7127 Type 5. The test specimen is produced by molding the material for forming a collective coating into a predetermined shape and curing it. Curing conditions are 0.3 J/cm$^2$ and, curing in air, and the film thickness is 250 μm.

In the present specification, the Young's modulus of an optical fiber is a value obtained by the following method.

Using a tensile tester AUTOGRAPH AG-IS (product name) manufactured by Shimadzu Corporation, measurements were carried out in accordance with JIS-C6837, with a sample length of 100 mm, a tensile speed of 100 mm/min, and a measured number of n=5, to obtain a stress-strain curve. The Young's modulus is calculated from the slope of the stress-strain curve corresponding to the two points of the strain amount ε1=0.1% and ε2=1% of the obtained stress-strain curve.

Figure 1:
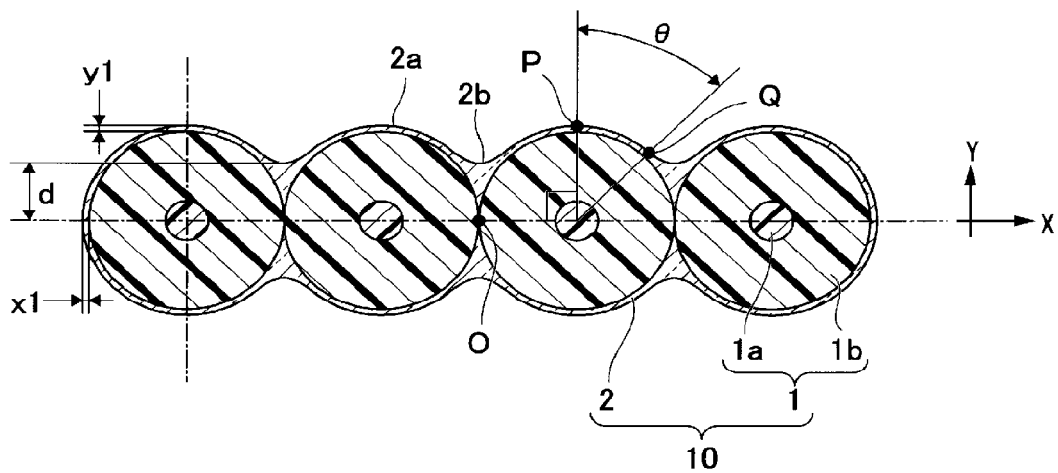
FIG. 1 is a cross-sectional view showing one embodiment of the plastic optical fiber ribbon of the present invention.

FIG. 1 shows one embodiment of the plastic optical fiber ribbon of the present invention. Reference numeral 1 denotes a plastic optical fiber (hereinafter also referred to as an optical fiber), reference numeral 2 denotes a collective coating, and reference numeral 10 denotes a plastic optical fiber ribbon (hereinafter also referred to as an optical fiber ribbon).

The optical fiber ribbon 10 of the present embodiment is one in which four optical fibers 1 are arranged in parallel and in a row, and integrated by applying a collective coating 2 to the outer circumference of them. The center axes of the four optical fibers 1 are present in the same plane and are parallel to one another.

In FIG. 1, the length direction of the optical fiber 1 is defined as the Z direction (not shown), the straight line direction connecting the centers of the four optical fibers 1 in the cross section perpendicular to the Z direction is defined as the X direction, and the direction perpendicular to the Z direction and the X direction is defined as the Y direction. The X direction is the width direction of the optical fiber ribbon 10, and the Y direction is the thickness direction of the optical fiber ribbon 10. An axis which is on a straight line connecting the centers of the four optical fibers 1, which passes through points equidistant from both ends in the width direction (X direction) of the optical fiber ribbon and which is parallel to the Z direction, is referred to as the center axis O of the optical fiber ribbon 10.

In the present embodiment, the four optical fibers 1 are arranged adjacent to one another, and their outer surfaces are in contact with one another.

The outer surfaces of the optical fibers being in contact with one another in the present invention means that the shortest distance between the outer surfaces of the adjacent optical fibers is at most 5 μm as an allowable range of manufacturing error.

The number of the optical fibers may be at least two. The upper limit is not limited, but is preferably at most 8, more preferably at most 4, from the viewpoint of reducing the diameter of the cable.

In the present embodiment, the collective coating 2 is formed to be thin so as to follow the outer surfaces of the optical fibers 1, and the outer surfaces on both sides in the thickness direction (Y direction) of the optical fiber ribbon 10 have a mountain-valley shape that follows the outer surfaces of the optical fibers 1. In the FIG., reference numeral 2a indicates the peak of a mountain and 2b indicates a valley. In the outer surface of the optical fiber ribbon 10, there is an inclined portion in which the thickness of the collective coating 2 gradually increases in the direction from the peak 2a of the mountain toward the valley 2b.

In the cross section perpendicular to the Z direction, a point where a straight line passing through the center of the optical fiber 1 and perpendicular to the X direction intersects with the outer surface of the optical fiber ribbon 10 is regarded as the apex P of the mountain. The symbol Q indicates the point at which the thickness of the collective coating 2 starts to gradually increase, i.e. the starting point of the inclined portion.

In the cross section perpendicular to the Z direction, the central angle θ of the sector formed by connecting the arc from the apex P of the mountain to the inclined portion, of the outer surface of the optical fiber ribbon 10, i.e. the arc from the apex P of the mountain to the starting point Q of the inclined portion, and the center of the optical fiber 1, is from 30 to 80°. When the central angle θ is at least 30°, efficiency for positioning at the time of placing the optical fiber ribbon 10 on a plurality of V grooves, will be excellent. When it is at most 80°, the optical fiber ribbon 10 will be excellent in torsion resistance. The central angle θ is more preferably from 40 to 70°, and further preferably from 45 to 65°.

The minimum value of the distance from the plane where the center axes of the respective optical fibers 1 exist, to the valley 2b of the outer surface of the optical fiber ribbon 10, is regarded as the thickness d of the collective coating at the valley. The thickness d is preferably at least 3 μm, more preferably at least 5 μm, particularly preferably at least 10 μm.

An optical fiber 1 of the present embodiment is composed of one plastic optical fiber 1a and a reinforcing layer 1b covering its outer circumference. If necessary, another covering layer may be provided around the reinforcing layer 1b.

The plastic optical fiber 1a is composed of a core and a clad, and a known one may be used. It may be either a refractive index distribution type (GI type) optical fiber, or a step refractive index type (SI type) optical fiber. It may be either a single mode optical fiber or a multicore optical fiber.

As a material of the plastic optical fiber 1a, for example, a fluorinated resin, an acrylic resin, a polycarbonate-type resin, a cycloolefin-type resin, etc. may be mentioned.

As the material of the reinforcing layer 1b, a known material may be used. For example, an acrylic resin, a polycarbonate resin, vinylidene fluoride, polyethylene terephthalate, nylon, an ultraviolet curable urethane acrylate resin or a cycloolefin resin may be mentioned.

When the optical fiber 1 has another covering layer around the reinforcing layer 1b, a known material may be used as the material of another covering layer. For example, an ultraviolet curable epoxy acrylate resin or an electron beam curable epoxy acrylate resin may be mentioned.

The outer diameter of the optical fiber 1 is not particularly limited. For example, it is preferably from 200 to 750 μm, more preferably from 250 to 400 μm.

The Young's modulus of the optical fiber 1 is preferably from 750 to 2,500 MPa, more preferably from 1,000 to 2,500 MPa, further preferably from 1,200 to 2,500 MPa, particularly preferably from 1,400 to 2,000 MPa. When the Young's modulus of the optical fiber 1 is at least the lower limit value in the above range, a problem such as an increase in loss at the time of handling the ribbon is unlikely to occur, and when the Young's modulus is at most the upper limit value, an increase in transmission loss of the optical fiber can be suppressed.

As the material of the collective coating 2, for example, an ultraviolet curable resin or an electron beam curable resin, such as urethane acrylate, or an ultraviolet curable resin or an electron beam curable resin, such as epoxy acrylate, is preferred.

In a case where transparency is required for the collective coating 2, a urethane acrylate resin is preferred.

The Young's modulus of the collective coating 2 is preferably at least 400 MPa and is preferably at most 1,000 MPa. Particularly, it is preferably from 400 to 1,000 MPa, more preferably from 500 to 800 MPa. When the Young's modulus of the collective coating 3 is at least the lower limit value in the above range, it is excellent in torsion resistance, and a problem such as separation is unlikely to occur at the time of handling the ribbon, and when it is at most the upper limit value, a transmission loss after ribbonization of the optical fiber can be suppressed.

The thickness of the collective coating 2 is such that when y1 represents the thickness of the collective coating 2 in the Y direction passing through the center of the optical fiber 1 (i.e. the thickness of the collective coating 2 at the peak of the mountain), and x1 represents the thickness of the collective coating 2 in the X direction passing through the center of the optical fiber 1, y1 is preferably from 3 to 50 μm, more preferably from 5 to 20 μm, further preferably from 5 to 10 μm. x1 is preferably from 3 to 50 μm, more preferably from 5 to 20 μm, further preferably from 5 to 10 μm.

The optical fiber ribbon 10 can be produced by aligning the plurality of optical fibers 1 in parallel and in a row, and in the aligned state, applying a resin to the outer circumference of them and curing it to form a collective coating 2. The application of the resin can be carried out by a method in which the plurality of the optical fibers 1 are, in the aligned state, permitted to enter and run through a coating die.

By forming the collective coating 2 to be thin, it is possible to provide a mountain-valley shape that follows the outer surfaces of the optical fibers 1, on the outer surface of the optical fiber ribbon 10. The shape of the outer surface of the optical fiber ribbon 10 can be controlled by the shape of the die at the outlet of the coating die. The central angle θ and the thickness d of the collective coating at the valley can be controlled also by the viscosity of the resin to be applied by the coating die.

In the optical fiber ribbon of the present embodiment, the outer surface in the thickness direction has a mountain-valley shape, the central angle θ is appropriately large and concave grooves having a sufficient depth are formed, whereby positioning will be easy when the optical fiber ribbon is placed on a plurality of V grooves. Therefore, the operation efficiency in the case of multi-core collective connection using a fixing member having a plurality of V grooves will be improved.

Further, since the outer surfaces on both sides in the thickness direction are formed in a mountain-valley shape, when laminating a plurality of optical fiber ribbons in the thickness direction, positional deviation is unlikely to occur, and positioning stability will be excellent.

Figure 2:
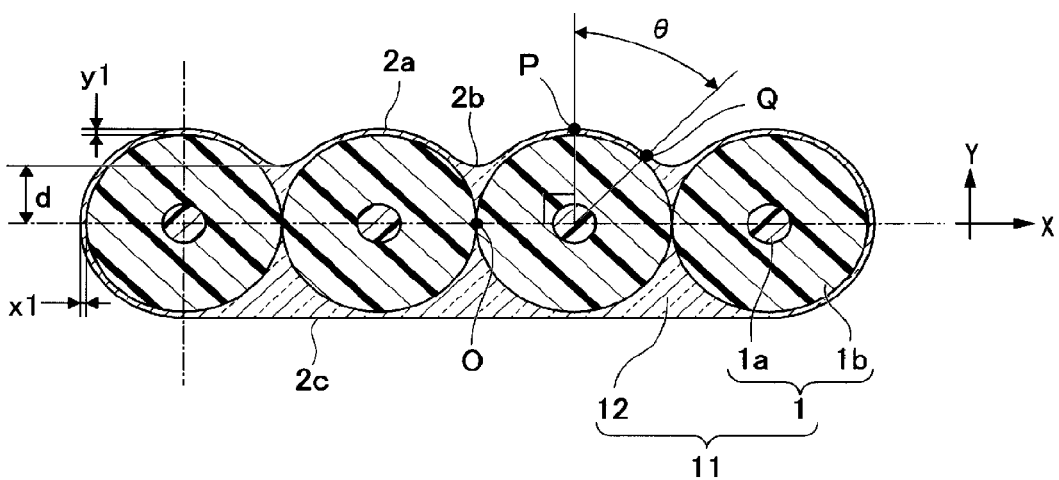
FIG. 2 is a cross-sectional view showing another embodiment of the plastic optical fiber ribbon of the present invention.
Figure 3:
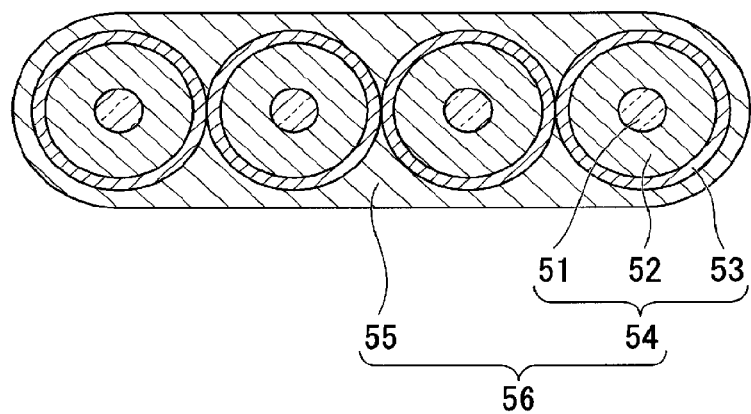
FIG. 3 is a cross-sectional view showing an example of a conventional plastic optical fiber ribbon.
Figure 4:
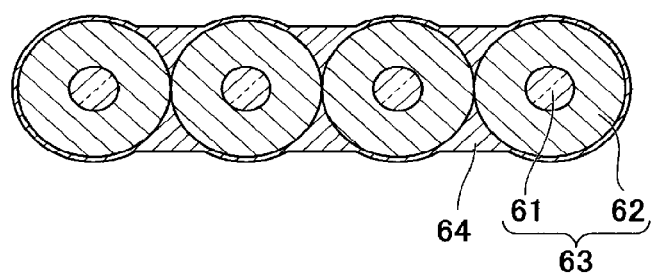
FIG. 4 is a cross-sectional view showing another example of a conventional plastic optical fiber ribbon.

Further, even if the thickness of the collective coating at the peak of the mountain is made thin, the thickness of the collective covering is gradually increased from the peak of the mountain toward the valley so as to increase the thickness of the collective covering at the valley, whereby excellent torsion resistance can be realized. In the optical fiber ribbon of the present embodiment, the outer surfaces on both sides in the thickness direction are formed in a mountain-valley shape. However, as shown in FIG. 2, only one outer surface may be formed in a mountain-valley shape, and the other outer surface may be made to be a flat surface 2c. In FIG. 2, the same components as those in FIG. 1 are identified by the same reference numerals, and their description is omitted.

The optical fiber ribbon 11 of the present embodiment can be produced by changing the shape of the outlet die of the coating die, so that when forming the collective coating 12, one outer surface in the thickness direction of the optical fiber ribbon 11 has a mountain-valley shape and the other outer surface is a flat surface 2c.

In this way, when the shape of the outer surface is different between one side and the other side (the front side and the back side) in the thickness direction of the optical fiber ribbon 11, such is preferred in that the front side and the back side of the optical fiber ribbon 11 can be distinguished.

Further, the outer surfaces of the adjacent optical fibers may not be in contact with each other, or may be spaced apart from each other at a predetermined distance. When the outer surfaces of the optical fibers are in contact with one another, such is preferred in view of easy alignment of axes in multi-core collective connection.

When the optical fibers are arranged apart from one another, the shortest distance between the outer surfaces of the adjacent optical fibers is preferably at most 5 μm, more preferably at most 3 μm, from the viewpoint of optical axis adjustment.

EXAMPLES

Hereinafter, the present invention will be described in more detail with reference to Examples, but the present invention is not limited to these Examples.
<Measurement Methods>
[Efficiency for Positioning to V Grooves]

A quadruple V-groove having four rows of V grooves continuously formed at a pitch of 250 μm on the horizontal plane wherein two inclined planes forming each V groove were at an angle of 90°, was prepared. An optical fiber ribbon composed of four optical fibers, was cut into a length of 1 m to obtain a sample to be measured. One end of the sample to be measured was placed on the quadruple V groove, and a weight of 20 g was placed thereon to fix the end. The other end of the sample to be measured was connected to a light receiver. Using an LED with a wavelength of 850 nm as a light source, via the light guiding optical fiber having a core diameter of 50 μm, light was guided to the first optical fiber located at the outermost position in the width direction among the plurality of optical fibers constituting the sample to be measured on the quadruple V-groove. The position of the optical fiber for guiding light was adjusted so that the optical power emitted from the first optical fiber was maximized, and the optical loss in the first optical fiber was measured. Next, while moving the position of the optical fiber for guiding light by 250 μm in the horizontal direction each time, optical losses in the remaining three optical fibers were sequentially measured.

The state in which the width direction of the optical fiber ribbon placed on the quadruple V groove coincides with the horizontal direction, is the most accurately positioned state, and in such a case, each of the optical losses in the four optical fibers becomes small.

Based on the maximum value (hereinafter referred to as the maximum loss value) among the optical losses of the four optical fibers, the efficiency for positioning to V grooves was evaluated according to the following standards. The smaller the maximum loss value, the better the efficiency for positioning to V grooves.

◯: The maximum loss value is at most 0.5 dB.

Δ: The maximum loss value is larger than 0.5 dB and at most 1.0 dB.

×: The maximum loss value is larger than 1.0 dB.

[Torsion Resistance]

By grasping the optical fiber ribbon in a no loose state by a pair of gripping tools with a distance of 10 mm, one of the gripping tools was rotated by 90° about the central axis O of the optical fiber ribbon as a rotation axis, to apply a torsional stress. The state in which the one of the gripping tools was rotated by 90° was held for 5 seconds, and then, returned to the original state, whereupon the appearance of the optical fiber ribbon was observed to check the presence or absence of abnormality (separation or peeling).

Separation means a state in which at least one of the optical fibers constituting the optical fiber ribbon is separated into a single core, and peeling means a state in which the optical fiber ribbon structure is maintained and usable, but peeling has occurred between the collective coating and the optical fibers.

The following Ex. 1 to 6 are Examples of the present invention, and Ex. 7 is a Comparative Example.

Ex. 1

An optical fiber ribbon having the structure shown in FIG. 1 was produced by using four optical fibers.

Each optical fiber was one in which a reinforcing layer of a polycarbonate resin was provided around a GI type plastic optical fiber having a core diameter of 60 μm, and the outer diameter of the optical fiber was 250 μm, and the Young's modulus of the optical fiber was 1,500 MPa.

The material of the collective coating was an ultraviolet-curable urethane acrylate resin, and its Young's modulus was 563 MPa. The thickness of the collective coating was almost uniform except for the inclined portion near the valley, and both x1 and y1 were 5 μm. The thickness d of the collective coating layer at each valley was in the range of from 5 to 6 μm.

With respect to the obtained optical fiber ribbon, the efficiency for positioning to V grooves and the torsion resistance were evaluated by the above methods. The results are shown in Table 1 (the same applies hereinafter, and "-" in the Table means "not measured").

Ex. 2 to 4

In Ex. 1, the material of the collective coating was changed to an ultraviolet curable urethane acrylate resin having a different Young's modulus. The Young's modulus of the collective coating in each Ex. was as shown in Table 1. Other than that, an optical fiber ribbon was produced in the same manner as in Ex. 1.

Ex. 5 to 7

Optical fiber ribbons having different central angles θ were produced in the same manner as in Ex. 1 except that in Ex. 1, the shape of the die at the outlet of the coating die for forming the collective coating was changed. The thickness of the collective coating was almost uniform except for the inclined portion near the valley, and both x1 and y1 were 5 μm. The central angle θ in each Ex. was as shown in Table 1.

The entire disclosure of Japanese Patent Application No. 2016-113749 filed on Jun. 7, 2016 including specification, claims, drawings and summary is incorporated herein by reference in its entirety.

REFERENCE SYMBOLS

1: Plastic optical fiber
1a: Plastic optical fiber
1b: Reinforcing layer
2, 12: Collective coating
2a: Peak of mountain
2b: Valley
2c: Flat surface
10, 11: Plastic optical fiber ribbon
P: Apex
Q: Starting point of inclined portion
θ: Central angle

What is claimed is:

1. A plastic optical fiber ribbon, comprising:
a plurality of plastic optical fibers integrated by a collective coating and arranged so that their center axes are parallel to one another in the same plane,
wherein at least one outer surface in a thickness direction of the plastic optical fiber ribbon has a mountain-valley shape following outer surfaces of the plastic optical fibers, in which an inclined portion is present where the collective coating has a gradually increasing thickness in a direction from a peak of the mountain toward a valley of the mountain, and
in a cross section perpendicular to a longitudinal direction of the plastic optical fiber ribbon, a central angle θ of a sector, which is formed by connecting an arc from the peak of the mountain to a point of the inclined portion where the thickness of the collective coating starts to gradually increase on the outer surface of the plastic optical fiber ribbon and a center of the plastic optical fiber, is from 30 to 80°.

2. The plastic optical fiber ribbon according to claim 1, wherein the collective coating has a Young's modulus of at least 400 MPa.

3. The plastic optical fiber ribbon according to claim 1, wherein the outer surfaces of adjacent plastic optical fibers are in contact with each other.

TABLE 1

| | Ex. 1 | Ex. 2 | Ex. 3 | Ex. 4 | Ex. 5 | Ex. 6 | Ex. 7 |
|---|---|---|---|---|---|---|---|
| Central angle θ [°] | 65 | 65 | 65 | 65 | 73 | 35 | 25 |
| Thickness d of collective coating at a valley [μm] | 5 to 6 | — | — | — | 3 to 4 | 10 to 11 | 12 to 13 |
| Young's modulus of collective coating [MPa] | 563 | 91 | 421 | 878 | 563 | 563 | 563 |
| Efficiency for positioning Maximum loss value [dB] | 0.3 | 0.4 | 0.3 | 0.4 | 0.3 | 0.6 | 1.2 |
| Evaluation | ○ | ○ | ○ | ○ | ○ | Δ | x |
| Torsion resistance | No abnormality | Separation observed | Peeling observed | No abnormality | No abnormality | No abnormality | No abnormality |

As shown in the results of Table 1, the optical fiber ribbons in Ex. 1 to 6 in which the central angle θ is from 30 to 80° are excellent in efficiency for positioning to V grooves. Especially Ex. 1 and 4 to 6 in which the Young's modulus of the collective coating is at least 400 MPa, are also excellent in torsion resistance.

4. The plastic optical fiber ribbon according to claim 1, wherein the plastic optical fibers have outer diameters ranging from 200 to 750 μm.

5. The plastic optical fiber ribbon according to claim 1, wherein the thickness of the collective coating at the peak of the mountain is from 3 to 50 μm.

6. The plastic optical fiber ribbon according to claim 1, wherein the thickness of the collective coating at the valley is at least 3 μm.

7. A method for producing the plastic optical fiber ribbon according to claim 1, the method comprising:
   aligning the plurality of plastic optical fibers in parallel and in a row so that the plastic optical fibers are arranged in an aligned state, and
   applying a resin to the outer circumference of the plastic optical fibers in the aligned state, and curing the resin to form the collective coating.

8. The method according to claim 7, wherein the resin is applied to the plastic optical fibers by permitting the plastic optical fibers, in the aligned state, to enter and run through a coating die.

9. The plastic optical fiber ribbon according to claim 1, wherein the central angle θ ranges from 40 to 70°.

10. The plastic optical fiber ribbon according to claim 1, wherein the central angle θ ranges from 45 to 65°.

11. The plastic optical fiber ribbon according to claim 1, wherein the thickness of the collective coating at the valley is at least 5 μm.

12. The plastic optical fiber ribbon according to claim 1, wherein the thickness of the collective coating at the valley is at least 10 μm.

\* \* \* \* \*